(12) United States Patent
Butz

(10) Patent No.: US 8,490,321 B1
(45) Date of Patent: Jul. 23, 2013

(54) UV REFLECTIVE FISHING LURE SYSTEM

(76) Inventor: Scott A. Butz, Fargo, ND (US)

( * ) Notice: Subject to any disclaimer, the term of this patent is extended or adjusted under 35 U.S.C. 154(b) by 0 days.

(21) Appl. No.: 13/437,426

(22) Filed: Apr. 2, 2012

Related U.S. Application Data

(62) Division of application No. 12/612,424, filed on Nov. 4, 2009.

(51) Int. Cl.
*A01K 85/01* (2006.01)
*A01K 85/00* (2006.01)

(52) U.S. Cl.
USPC .......... 43/42.53; 43/17.6; 43/42.24; 43/42.32

(58) Field of Classification Search
USPC ................ 43/42.53, 17.6, 17.5, 42.32, 42.33, 43/42.34, 42.24
See application file for complete search history.

(56) References Cited

U.S. PATENT DOCUMENTS

| | | | |
|---|---|---|---|
| 330,325 A | 11/1885 | Hendrick | |
| 3,300,325 A * | 1/1967 | Lindquist | 106/163.01 |
| 3,653,145 A | 4/1972 | Stout | |
| 3,707,798 A * | 1/1973 | Tryon | 43/3 |
| 3,957,675 A * | 5/1976 | Schutt | 252/586 |
| 4,064,304 A | 12/1977 | Fujita | |
| 4,064,305 A | 12/1977 | Wallin | |
| 4,494,245 A * | 1/1985 | Burkhead et al. | 43/1 |
| 4,530,179 A * | 7/1985 | Larew | 43/42.24 |
| 4,589,223 A * | 5/1986 | Hastings | 43/42.53 |
| 4,599,820 A | 7/1986 | Hill | |
| 4,691,464 A * | 9/1987 | Rudolph | 43/3 |
| 4,731,948 A * | 3/1988 | Helton | 43/42.53 |
| 4,826,729 A | 5/1989 | Kitamura | |
| 4,829,695 A * | 5/1989 | Hoecherl | 43/3 |
| 4,831,764 A * | 5/1989 | Jecevicus | 43/42.53 |
| 4,835,899 A * | 6/1989 | Helton | 43/42.53 |
| 4,920,692 A | 5/1990 | Kitamura | |
| 5,079,048 A * | 1/1992 | Anitole | 428/17 |
| 5,134,025 A * | 7/1992 | Zenda et al. | 428/317.9 |
| 5,293,709 A | 3/1994 | Cripe | 43/3 |
| 5,408,780 A * | 4/1995 | Chambers, Sr. | 43/42.53 |
| 5,409,760 A | 4/1995 | Neitz | |
| 5,485,556 A | 1/1996 | Takagi | |
| 5,689,364 A | 11/1997 | McGregor | |
| 5,710,876 A | 1/1998 | Peercy | |
| 5,725,892 A * | 3/1998 | Gibbs | 43/42.53 |
| 5,920,903 A | 7/1999 | Koehntop | |
| 5,956,888 A * | 9/1999 | Vreeland et al. | 43/42.53 |

(Continued)

FOREIGN PATENT DOCUMENTS

| | | | |
|---|---|---|---|
| JP | 2002065115 | | 3/2002 |
| JP | 2002065115 A * | | 3/2002 |
| JP | 2002238403 | | 8/2002 |
| JP | 2002238403 A * | | 8/2002 |

*Primary Examiner* — Darren W Ark
(74) *Attorney, Agent, or Firm* — Michael S. Neustel

(57) ABSTRACT

A UV reflective fishing lure system for consistently illuminating underwater for prolonged periods and at multiple depths to attract various fish species. The UV reflective fishing lure system generally includes a base substance, a UV reflective substance and a colorant all mixed together and solidified to form at least a portion of a fishing lure. The UV reflective substance is comprised of barium sulfate, calcium carbonate, or powdered sugar, while the base substance is comprised of a liquid rubber or plastic and the colorant is comprised of a water based coloring. The formed fishing lure reflects UV light to be seen by fish species at various depths within water.

12 Claims, 3 Drawing Sheets

U.S. PATENT DOCUMENTS

| | | | | |
|---|---|---|---|---|
| 6,082,036 | A * | 7/2000 | Cripe | 43/3 |
| 6,115,953 | A * | 9/2000 | Wise | 43/2 |
| 6,127,022 | A * | 10/2000 | Pretorius | 428/195.1 |
| 6,174,525 | B1 * | 1/2001 | Kelley | 43/42 |
| 6,192,616 | B1 * | 2/2001 | Kent | 43/42.32 |
| 6,205,697 | B1 * | 3/2001 | Kent | 43/42.53 |
| 6,266,916 | B1 * | 7/2001 | Dugan | 43/42.24 |
| 6,343,432 | B1 | 2/2002 | Brown | |
| 6,384,824 | B1 | 5/2002 | Morgan | |
| 6,392,238 | B1 | 5/2002 | Vezard | |
| 6,408,567 | B1 * | 6/2002 | Clark | 43/42.53 |
| 6,636,701 | B1 | 10/2003 | Vezard | |
| 6,640,413 | B1 | 11/2003 | Martin | |
| 6,803,910 | B2 | 10/2004 | Pfister | |
| 6,941,461 | B2 | 9/2005 | Carro | |
| 6,948,695 | B1 * | 9/2005 | Clark | 43/42.53 |
| 6,961,461 | B2 | 11/2005 | MacKinnon | |
| 7,091,973 | B1 | 8/2006 | Cohen | |
| 7,106,325 | B2 | 9/2006 | Ritter | |
| 7,189,128 | B2 * | 3/2007 | Halliday | 441/64 |
| 7,216,455 | B2 * | 5/2007 | Becker | 43/42.37 |
| 7,260,913 | B2 * | 8/2007 | Becker | 43/17.6 |
| 7,327,365 | B2 | 2/2008 | Chen | |
| 7,437,000 | B1 | 10/2008 | Rosenthal | |
| 7,484,327 | B2 * | 2/2009 | Moore | 43/42.28 |
| 7,497,046 | B1 * | 3/2009 | Jefferson | 43/42.24 |
| 7,572,160 | B2 * | 8/2009 | Halliday | 441/64 |
| 7,793,457 | B2 * | 9/2010 | Hogan | 43/42.24 |
| 7,803,360 | B2 * | 9/2010 | Hanson et al. | 43/42.06 |
| 7,819,128 | B2 | 10/2010 | Clark | |
| 7,966,764 | B2 * | 6/2011 | Johnson et al. | 43/42.32 |
| 8,132,356 | B2 * | 3/2012 | Gill | 43/42.53 |
| 8,173,116 | B1 * | 5/2012 | Buzzi | 43/42 |
| 2002/0095848 | A1 * | 7/2002 | Northouse | 43/3 |
| 2002/0144449 | A1 | 10/2002 | Brown | |
| 2003/0117620 | A1 | 6/2003 | Balas | |
| 2003/0182840 | A1 * | 10/2003 | Colley | 43/3 |
| 2003/0192226 | A1 * | 10/2003 | Cain | 43/3 |
| 2003/0234784 | A1 | 12/2003 | Grzeszczuk | |
| 2005/0034354 | A1 * | 2/2005 | Lunt et al. | 43/42.53 |
| 2006/0092315 | A1 | 5/2006 | Payonk | |
| 2006/0096155 | A1 * | 5/2006 | Kline | 43/42.33 |
| 2006/0117637 | A1 * | 6/2006 | Jeckle | 43/3 |
| 2006/0121166 | A1 * | 6/2006 | Jeckle | 426/395 |
| 2007/0132759 | A1 | 6/2007 | Mallick | |
| 2007/0144054 | A1 * | 6/2007 | Warczok et al. | 43/42.24 |
| 2007/0157504 | A1 * | 7/2007 | Nelson | 43/3 |
| 2007/0199228 | A1 * | 8/2007 | Johnson | 43/3 |
| 2007/0200337 | A1 * | 8/2007 | Johnson et al. | 43/3 |
| 2007/0289194 | A1 | 12/2007 | Alexander | |
| 2008/0000140 | A1 | 1/2008 | Mitchell | |
| 2008/0104879 | A1 * | 5/2008 | Poppe | 43/42.32 |
| 2008/0115403 | A1 * | 5/2008 | Shelton et al. | 43/42.24 |
| 2008/0163538 | A1 | 7/2008 | Butz | |
| 2009/0000177 | A1 | 1/2009 | Johnson | |
| 2009/0130349 | A1 | 5/2009 | Alvarez | |
| 2009/0165732 | A1 | 7/2009 | Farley | |
| 2009/0213120 | A1 | 8/2009 | Nisper | |
| 2010/0037509 | A1 * | 2/2010 | Halliday | 43/42.53 |
| 2010/0146837 | A1 * | 6/2010 | Zernov | 43/42.53 |
| 2010/0269398 | A1 * | 10/2010 | Ware | 43/42.53 |
| 2012/0005944 | A1 * | 1/2012 | Carswell et al. | 43/42.24 |
| 2012/0023804 | A1 * | 2/2012 | Hogan | 43/42.24 |

* cited by examiner

UV REFLECTIVE FISHING LURE SYSTEM

CROSS REFERENCE TO RELATED APPLICATIONS

I hereby claim benefit under Title 35, United States Code, Section 120 of U.S. patent application Ser. No. 12/612,424 filed Nov. 4, 2009. This application is a divisional of the Ser. No. 12/612,424 application. The Ser. No. 12/612,424 application is currently pending. The Ser. No. 12/612,424 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a fishing lure and more specifically it relates to a UV reflective fishing lure system for consistently illuminating underwater for prolonged periods and at multiple depths to attract various fish species.

2. Description of the Related Art

Any discussion of the related art throughout the specification should in no way be considered as an admission that such related art is widely known or forms part of common general knowledge in the field.

Fishing lures have been in use for years and are manufactured in a wide variety of shapes and colors. Each type and kind of fishing lure has certain properties that are believed to attract fish. A commonly sought property among fishing lures is the ability of the fishing lure to be visible underwater.

One attempt at achieving visibility underwater among fishing lures is to paint the fishing lure a certain color, such as white, black, or neon, wherein the color choice is thought to make the lure visible under various water conditions. Another attempt making a fishing lure visible underwater is to use a "glow jig" which absorbs UV light and is meant to release the absorbed light underwater for the fish to see and be attracted to the light.

However, both of these methods have pitfalls, in that neither have properties to maintain a substantial visibility or brightness underwater at depths commonly associated with catching fish, such as 10 feet underwater and below. In addition, the "glow jigs" must often be constantly recharged by reeling the lure back in to reapply UV light to the lure. This can often times be a hassle and result in an unproductive fishing outing. Because of the inherent problems with the related art, there is a need for a new and improved UV reflective fishing lure system for consistently illuminating underwater for prolonged periods and at multiple depths to attract various fish species.

BRIEF SUMMARY OF THE INVENTION

A system for consistently illuminating underwater for prolonged periods and at multiple depths to attract various fish species. The invention generally relates to a fishing lure which includes a base substance, a UV reflective substance and a colorant all mixed together and solidified to form at least a portion of a fishing lure. The UV reflective substance is comprised of barium sulfate, calcium carbonate, or powdered sugar, while the base substance is comprised of a liquid rubber or plastic and the colorant is comprised of a water based coloring. The formed fishing lure reflects UV light to be seen by fish species at various depths within water.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
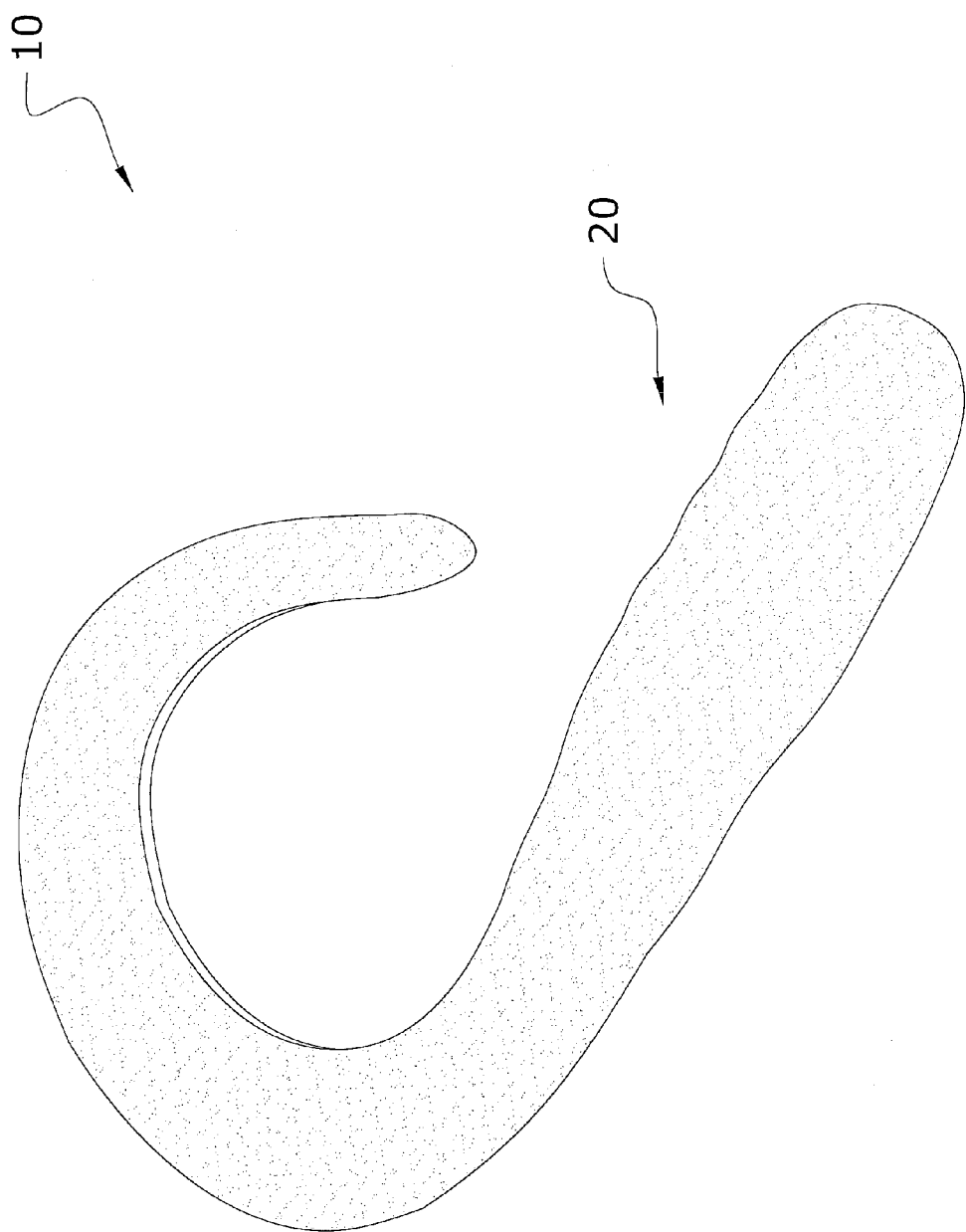
FIG. 1 is an upper perspective view of the present invention in a flexible worm/tadpole structure.
Figure 2:
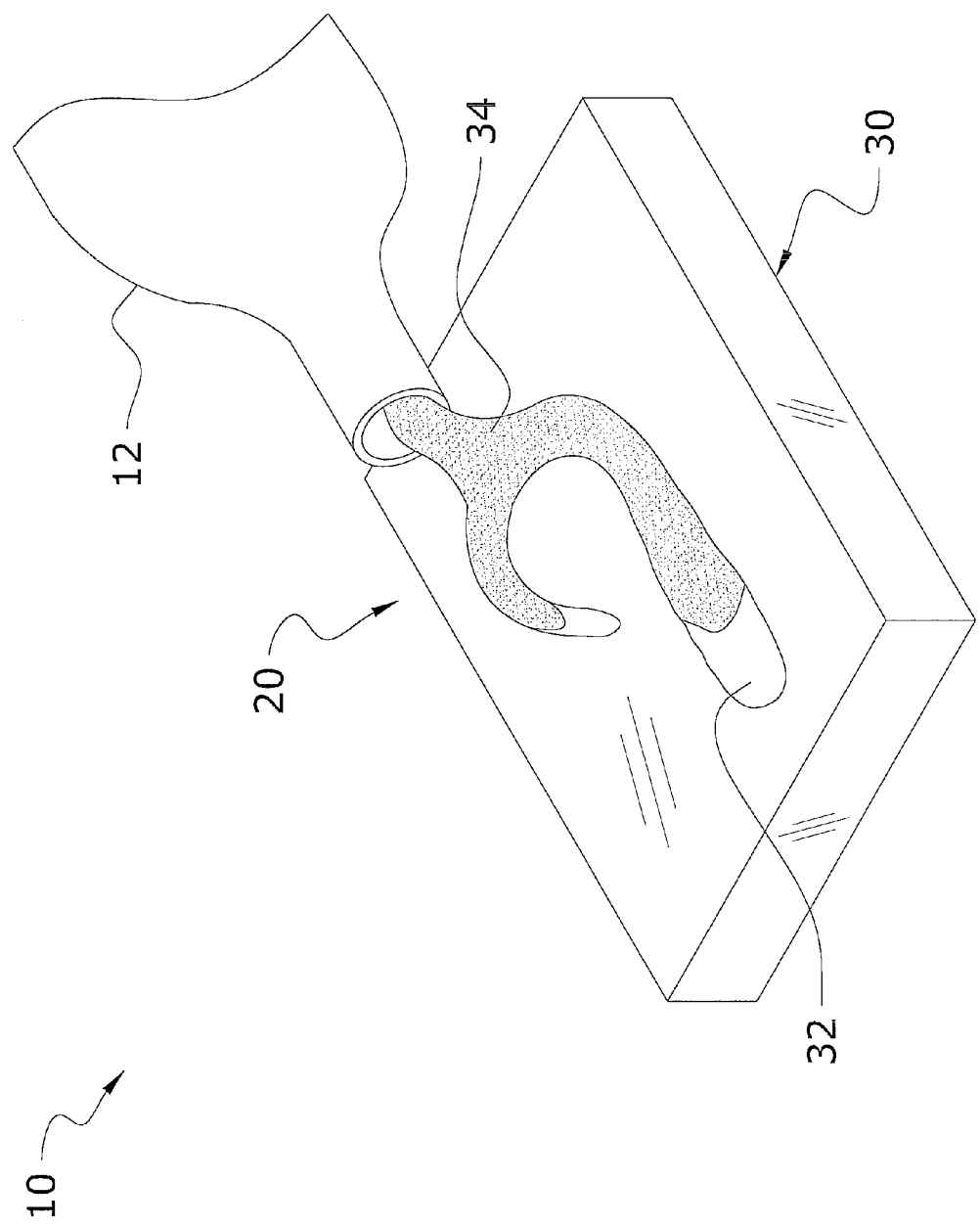
FIG. 2 is an upper perspective view of the liquid composition including the base substance, the reflective substance, and the colorant being poured within a mold to cool and form into a solid state.
Figure 3:
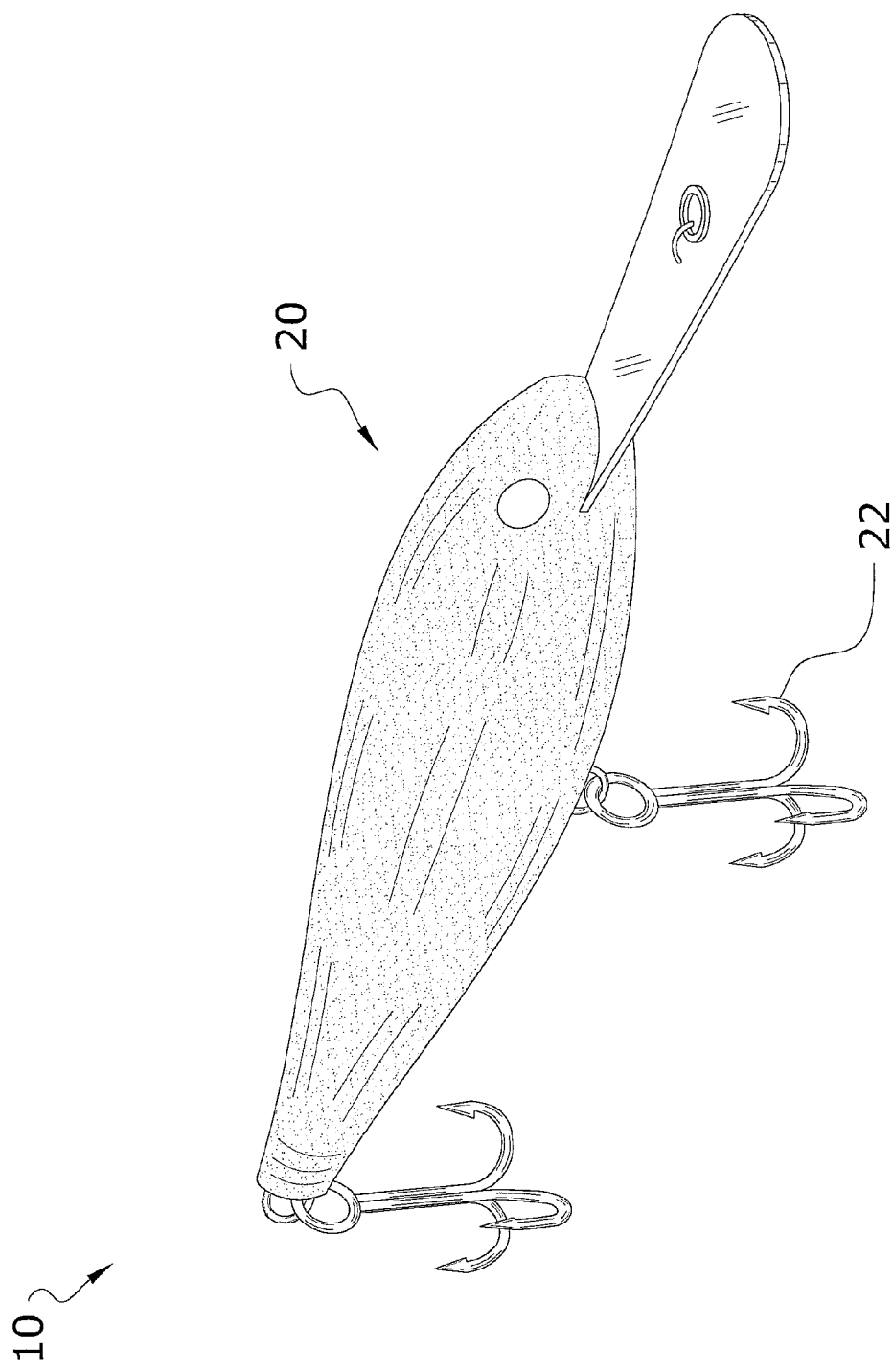
FIG. 3 is an upper perspective view of the present invention coated upon a crank bait type fishing lure.

Turning now descriptively to the drawings, in which similar reference characters denote similar elements throughout the several views, FIGS. 1 through 3 illustrate a UV reflective fishing lure system 10, which comprises a base substance, a UV reflective substance and a colorant all mixed together and solidified to form at least a portion of a fishing lure 20. The UV reflective substance is comprised of barium sulfate, calcium carbonate, or powdered sugar, while the base substance is comprised of a liquid rubber or plastic and the colorant is comprised of a water based coloring. The formed fishing lure 20 reflects UV light to be seen by fish species at various depths within water. The fishing lure 20 may or may not have hooks 22 and may resemble bait or any type of fishing lure, or a combination of both.

B. Decoy Structure

The present invention may be embodied in various decoy structures 20, such as but not limited to fishing lures and waterfowl decoys. The decoy structures 20 may be embodied entirely by the composition or partially embodied by the composition. In the case of partial embodiment, the composition may be painted upon the decoy structure, partially mixed therein, attached or connected to the decoy structure, or various other methods of combining the composition with the decoy structure.

Further, the composition may be a solid or simply a coating to coat another support structure to comprise the decoy structure. The solidified composition may further be flexible, hard, or a combination of both. The decoy structures comprised of fishing lures may include be flexible worms or tadpoles such as illustrated in FIG. 1, crank baits such as illustrated in FIG. 3, jigs, and spinner baits used to catch a wide variety of fish species, such as but not limited to bass, trout, walleye, crappy, perch, dog fish, pike, and musky.

C. Base Substance

The base substance is comprised of a liquid rubber, plastic, and/or vinyl in an initial state capable of forming to a solid in a final state to define a specific shaped decoy structure 20. The base substance is also capable of mixing with the reflective substance and colorant to produce the decoy structure.

The base substance is generally comprised of a light color, such as white in order to be easily changed to the desired color via the colorant, however various types of colored base substances may be appreciated. Various types of non toxic, biodegradable, odorless, and edible base substances may be used which may comprise various types of rubbers, plastics, or other similar compounds.

D. Reflective Substance

The reflective substance is added to the base substance to provide the composition with reflective properties. It is emphasized that the reflective substance reflects ultraviolet (UV) light rather than absorbing the UV light which is common with "glow jigs". The reflective substance may be a single substance or a combination of substances and may be formed in various colors as appreciated similar to the base substance. The reflective substance is comprised of a non toxic, biodegradable, edible, odorless substance that is able to mix with the base substance to form the composition.

In the preferred embodiment, the reflective substance is comprised of barium sulfate and/or calcium carbonate, or similar substances. The barium sulfate is less glossy than the calcium carbonate and is thus generally preferred to provide optimal UV reflection. The barium sulfate and calcium carbonate are also comprised of a pharmaceutical grade. In a further embodiment, the reflective substance may simply be comprised of powdered sugar.

E. Colorant

A colorant (e.g. tan, green, blue, red, yellow, black) may be added to the composition to create a different colored fishing lure. The amount of colorant added is dependent upon the amount of UVA reflection level for the particular feature and the desired visible light appearance of the fishing lure. The colorant is comprised of a water base substanced coloring which is added to the mixture of the reflective substance and the base substance.

F. Preparation of Composition

To prepare the composition, the liquid base substance and the reflective substance, which are generally in a cold state, are mixed together. Generally, a 4:1 or similar ratio is used with the base substance and the reflective substance. For example, two ounces of the base substance and one tablespoon of the reflective substance, which may be barium sulfate, calcium carbonate, or powdered sugar, are mixed together. The colorant may also be added at this time and mixed thoroughly with the mixture of the base substance and the reflective substance until a desired color is achieved.

The liquid composition 34 of the base substance, reflective substance, and colorant is now heated, such as by placing the composition in the microwave. For the above example, a heating time of one-two minutes may be used, while stirring every minute or periodically. Once the composition is heated, the composition 34 is poured into specific shape mold openings 32 of a mold 30 from the mixing container 12 and left to cool and thus form into the shape of the mold openings 32 (e.g. tadpole, etc.). Once the composition has cooled and thus solidified, the composition may be removed from the mold 30.

It is appreciated that the mold 30 may be in the shape of the fishing lure, in the shape of a portion of the fishing lure, or an attachment for the fishing lure. Hooks 22, eyelets, or other fastening mechanisms may also be placed in the mold to secure to the composition once the composition solidifies. Alternately, fastening mechanisms may be attached afterwards. The cooled composition may be flexible or hard. The liquid composition 34 may also be combined with a standard fishing lure in the mold 30 to only partially comprise, such as simply coating the standard fishing lure. The composition may further only coat a portion of the standard fishing lure.

G. Operation of Preferred Embodiment

In use, the fishing lure 20 is attached to the fishing line and used in a normal manner as a standard fishing lure. The fishing lure 20 reflects UV light underwater to efficiently attract the fish to the fishing lure 20. Since the fishing lure 20 reflects the light rather than absorbs the light, there is no need for recharging the fishing lure 20.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of forming a UV reflective fishing lure, comprising:
   providing a base substance;
   providing a UV reflective substance;
   providing a colorant comprising a water-based coloring;
   mixing said base substance, said UV reflective substance, and said colorant, wherein said base substance and said UV reflective substance are mixed at a 4:1 ratio;
   heating said mixture of said base substance, said UV reflective substance, and said colorant;
   stirring said mixture;
   providing a mold comprised of a fishing lure shape;
   cooling said mixture; and
   solidifying said mixture.

2. The method of forming a UV reflective fishing lure of claim 1, wherein said base substance is comprised of rubber.

3. The method of forming a UV reflective fishing lure of claim 1, wherein said base substance is in a liquid state.

4. The method of forming a UV reflective fishing lure of claim 1, further comprising the step of repeating said heating step and said stirring step until said mixture is heated.

5. The method of forming a UV reflective fishing lure of claim 1, wherein said cooled mixture is comprised of a flexible structure.

6. The method of forming a UV reflective fishing lure of claim 1, wherein said cooled mixture is comprised of a hard structure.

7. The method of forming a UV reflective fishing lure of claim 1, wherein said UV reflective substance is comprised of barium sulfate.

8. The method of forming a UV reflective fishing lure of claim 1, wherein said fishing lure shape is comprised of a flexible worm structure.

9. A method of forming a UV reflective fishing lure, comprising:
- providing a base substance, wherein said base substance is in a liquid state;
- providing a UV reflective substance;
- providing a colorant comprising a water-based coloring;
- mixing said base substance, said UV reflective substance, and said colorant, wherein said base substance and said UV reflective substance are mixed at a 4:1 ratio;
- partially heating said mixture of said base substance, said UV reflective substance, and said colorant;
- stirring said mixture;
- repeating said partially heating step and said stirring step until said mixture is heated;
- providing a mold comprised of a fishing lure shape;
- pouring said heated mixture within said mold;
- cooling said mixture; and
- solidifying said mixture.

10. The method of forming a UV reflective fishing lure of claim 9, wherein said cooled mixture is comprised of a flexible structure.

11. The method of forming a UV reflective fishing lure of claim 9, wherein said cooled mixture is comprised of a hard structure.

12. The method of forming a UV reflective fishing lure of claim 9, wherein said UV reflective substance is comprised of barium sulfate.

* * * * *